US 8,078,568 B2

(12) United States Patent
Stuhec et al.

(10) Patent No.: US 8,078,568 B2
(45) Date of Patent: Dec. 13, 2011

(54) PROPERTIES OF DATA ELEMENTS

(75) Inventors: Gunther Stuhec, Heidelberg (DE);
Daniel Oberle, Durmersheim (DE)

(73) Assignee: SAP AG, Walldorf (DE)

( * ) Notice: Subject to any disclaimer, the term of this patent is extended or adjusted under 35 U.S.C. 154(b) by 1205 days.

(21) Appl. No.: 11/767,982

(22) Filed: Jun. 25, 2007

(65) Prior Publication Data

US 2008/0319937 A1 Dec. 25, 2008

(51) Int. Cl.
G06N 7/08 (2006.01)
G06N 7/00 (2006.01)
(52) U.S. Cl. .............................. 706/55; 705/42; 717/143
(58) Field of Classification Search .................. None
See application file for complete search history.

(56) References Cited

U.S. PATENT DOCUMENTS

| | | | |
|---|---|---|---|
| 5,444,841 A | 8/1995 | Glaser et al. | |
| 6,560,608 B1 | 5/2003 | Tomm et al. | |
| 6,662,237 B1 | 12/2003 | Leckie | |
| 6,694,338 B1 | 2/2004 | Lindsay | |
| 6,757,739 B1 | 6/2004 | Tomm et al. | |
| 7,155,665 B1 | 12/2006 | Browne et al. | |
| 7,194,695 B1 | 3/2007 | Racine et al. | |
| 2002/0116389 A1 | 8/2002 | Chen et al. | |
| 2002/0120506 A1 | 8/2002 | Hagen | |
| 2005/0198074 A1 | 9/2005 | Khayter et al. | |
| 2006/0106824 A1* | 5/2006 | Stuhec | 707/100 |
| 2006/0256851 A1* | 11/2006 | Wang et al. | 375/240.01 |

OTHER PUBLICATIONS

Kifer, M. et al., "Logical Foundations of Object-Oriented and Frame-Based Languages"; *J. Assoc Computing Machinery*, May 1995, pp. 1-100.
Decker S., et al., "OntoBroker: Ontology based Access to Distributed and Semi-Structured Information". *Kluwer Academic Publishers*, 1998. pp. 1-20.
"How to Solve the Business Standards Dilemma—CCTS Key Model Concepts", *The SAP Developer Network* (SAP AG, 2006). pp. 1-18.
"How to Solve the Business Standards Dilemma—The Context Driven Business Exchange", *The SAP Developer Network* (SAP AG 2005). pp. 1-19.

(Continued)

*Primary Examiner* — Omar Fernandez Rivas
*Assistant Examiner* — Kalpana Bharadwaj
(74) *Attorney, Agent, or Firm* — Fish & Richardson P.C.

(57) ABSTRACT

Methods and computer program products relating to properties of data elements. A computer-implemented method for identifying a property of a data element includes receiving a request for at least one sought property of a data element. The data element is configured for use in semantically identifying information portions in electronic communications. The sought property is to be valid in a context defined by at least one context value indicated by the request. The method includes identifying the at least one sought property by evaluating at least one logical rule that defines at least one property of the data element as being valid for a specified context. The method includes generating an output in response to the request that indicates the at least one sought property.

19 Claims, 6 Drawing Sheets

OTHER PUBLICATIONS

'Know How to Use Know-How' [online]. Ontoprise, 2006, [retrieved on Mar. 10, 2007]. Retrieved from the Internet: <URL: http://web.archive.org/web/20060208064330/www.ontoprise.de/content/index_eng.html>, p. 1-2.

'OntoBroker—The Power of Inferencing' [online]. Ontoprise, 2005, [retrieved on Mar. 10, 2007]. Retrieved from the Internet: <URL: http://web.archive.org/web/20051122071757/www.ontoprise.de/content/e3/e27/index_eng...>, p. 1.

Kifer, M., "F-Logic: A Higher-Order Language for Reasoning about Objects, Inheritance, and Scheme" (Jun. 3, 1997). pp. 1-21.

Stuhec, G. and Crawford, M., "How to Solve the Business Standards Dilemma—The CCTS Standards Stack". (SAP AG 2006). pp. 1-13.

Stuhec, G., "How to Solve the Business Standards Dilemma—The CCTS based Core Data Types" (SAP AG 2006). pp. 1-22.

"Core Components Technical Specification v2.01—Part 8 of the ebXML Framework" for UN/CEFACT, Nov. 15, 2003, pp. I-113.

"Adobe LiveCycle Designer FAQ" Adobe Systems Incorporated, 3 pages, 2004.

XForms 1.1, W3C Working Draft Nov. 15, 2004, Obtained from the Internet at http://www.w3.org/TR/2004/WD-xforms11-20041115, on Dec. 6, 2004, 26 pages.

XML Schema, W3C, Obtained from the Internet http://www.w3.org/XML/Schema on Jan. 3, 2005, 16 pages.

XForms—The Next Generation of Web Forms, W3C, obtained from the Internet at http://www.w3.org/MarkUp/Forms, on Jan. 3, 2005, 11 pages.

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, Obtained from the Internet at http://www.microsoft.com/office/infopath/prodinfo/overview.mspx, on Jan. 4, 2005, p. 1-2.

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>, p. 1-4.

GoXML Registry [online], Xenos, 2002 [retrieved on Mar. 23, 2005]. Retrieved from the Internet: <URL: http://www.xmlglobal.com/solutions/prod_goxml_registry.asp>, p. 1-2.

The Company of the Open Standard Solutions [online], ebXMLsoft Inc., 2001-2004 [retrieved on Mar. 23, 2005]. Retrieved from the Internet: <URL: http://www.ebsmlsoft.com/ >, p. 1-2.

Project: ebXML Registry/Repository: Summary [online], SourceForge.net, 2005 [retrieved on Mar. 23, 2005]. Retrieved from the Internet: <URL: http://sourceforge.net/projects/ebsmlrr >, p. 1-3.

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhaven, Philip A. Bernstein, and Erhard Rahm, "Generic Schema Matching with Cupid," 2001, *Proceedings of the 27th VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering (ICDE)*, pp. 1-12.

Lucian Popa, Yannis Velegrakis, Renee J. Miller, Mauricio A. Hernandez, Ronald Fagin, "Translating Web Data," 2002, *The Eleventh International WWW Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004.aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles" *ISO/IEC*, document dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

GEFEG EDIFIX, "EDIFIX Functions," [online], Xenos, 2002 [retrieved on Nov. 30, 2005]. <URL: http://www.gefeg.com/en/edifix/fx_functions.htm>, p. 1.

"Information technology—Metadata Registries (MDR)—Part 1: Framework" International Standard ISO/IEC 11179-1; Sep. 15, 2004; (32 pages).

"Information technology—Metadata Registries (MDR)—Part 2: Classification"; International Standard ISO/IEC 11179-2; Nov. 15, 2005 (16 pages).

"Information Technology—Metadata Registries (MDR)—Part 3: Registry Metamodel and Basic Attributes"; International Standard ISO/IEC 11179-3; Feb. 15, 2003 (108 pages).

"Information Technology—Metadata Registries (MDR)—Part 4: Formulation of Data Definitions" International Standard ISO/IEC 11179-04, Jul. 15, 2004 (16 pages).

"Information Technology—Metadata Registries (MDR)—Part 5: Naming and Identification Principles"; International Standard ISO/IEC 11179-5; Sep. 1, 2005, 20pages.

"Information Technology—Metadata Registries (MDR)—Part 6: Registration". International Standard ISO/IEC 111790-6; Jan. 15, 2005, 70pages.

EbXML Business Process Specification Schema Version 1.01 [online]. Oasis 2001, [retrieve on Mar. 21, 2005]. Retrieved from the Internet: <URL: http://www.ebxml.org/specs/ebBPSS.pdf >, p. 1.

"Chomsky's Revolution in Linguistics" [online]. The New York Review of Books, 1972, [retrieved on Sep. 12, 2005]. Retrieved from the Internet: <URL: http://www.chomsky.info/onchomsky/19720629.htm>, p. 1-2.

UN/CEFACT's Modeling Methodology (UMM) in a Nutshell, undated manuscript, believed to have been published Nov. 15, 2006. http://www.untmg.org/index.php?option=com_docman@&task=docclick&Itemid=137&bid=55&limitstart=0&limit=5, 3pages.

UN/CEFACT's Modeling Methodology (UMM): UMM Meta Model—Foundation Module Version 1.0 Technical Specification [online] ; CEFACT Oct. 6, 2006. Retrieved from the Internet: <URL: http://www.unece.org/cefact/umm/UMM_Foundation_Module.pdf, 92pages.

"Business Process Modeling Notation (BPMN) Information" [online]. OMG/BPMN [retrieved on Oct. 30, 2007]. Retrieved from the Internet: <URL: http://web.archive.org/web/20061011235521/http://www.bpmn.org/, p. 1-2.

"Architecture of Integrated Information Systems" [online] Wikipedia [retrieved on Oct. 30, 2007]. Retrieved from the Internet: <URL: http://en.wikipedia.org/wiki/Architecture_of_Integrated_Information_Systems, p. 1-2.

Chen et al., "Managing Semantic Metadata for the Semantic Grid," *Proceedings of the Knowledge Grid and Grid Intelligence Workshop*, Beijing, China, 2004, 9 pages.

Tao et al., "Applying the Semantic Web to Manage Knowledge on the Grid," *E-Science AHM*, 2004, Nottingham, England, 8 pages.

Tao et al, "Semantic Web Based Content Enrichment and Knowledge Reuse in E-science," *On the Move to Meaningful Internet Systems 2004: CoopIS, DOA, and ODBASE*, 2004, 14:654-669.

Peng and Law, "A Reference Data Model for Neesgrid Shake Table Experiments," *Proceedings of the International Symposium on Earthquake Engineering in the Past and Future Fifty Years*, 2004, 10 pages.

* cited by examiner

PROPERTIES OF DATA ELEMENTS

TECHNICAL FIELD

This document relates to identifying and/or defining a property of a data element.

BACKGROUND

United Nations Center for Trade Facilitation and Electronic Business (UN/CEFACT) has approved and distributed a version 2.01 of a document titled "Core Components Technical Specification-Part 8 of the ebXML Framework". The Core Components technical specification (CCTS) presents a methodology for developing a common set of building blocks, or core components, for standardizing business transactions between business partners and across industries. The core components define the exchanged information in terms of its semantic and structure and represent the general types of business data in use today.

The UN/CEFACT core components are based on class diagrams using the Unified Modeling Language (UML). A basic core component constitutes a singular business characteristic. In contrast, a broader concept consists of several components that can be individually varied and is therefore called an aggregate core component, because it is a collection of related pieces of business information. Association core components represent associations between different core components. Thus, any core component is generally classified as being either a basic, an aggregate or an association core component. In addition, the type of information that a basic core component may contain is defined through a core component type. Core component types have no business semantic (meaning). The core components can be represented using UML.

While all core components bear specific semantics, none of them carry any notion of the business context in which they are to be used. Rather, for every specific business context the core component takes the form of a piece of business data called a business information entity Like core components, the business information entities come in the three flavors basic, aggregate and association, which have essentially the same meaning here. Thus, every business information entity is based on a core component and is intended for use in a specific business context. The business information entity contains a narrower definition than the corresponding core component, may have fewer properties, and the allowed values of properties may be restricted. The names of business information entities can be derived by adding a qualifier to the name of the corresponding core component.

SUMMARY

The invention relates to properties of data elements.

In a first aspect, a computer-implemented method for identifying a property of a data element includes receiving a request for at least one sought property of a data element. The data element is configured for use in semantically identifying information portions in electronic communications. The sought property is to be valid in a context defined by at least one context value indicated by the request. The method includes identifying the at least one sought property by evaluating at least one logical rule that defines at least one property of the data element as being valid for a specified context. The method includes generating an output in response to the request that indicates the at least one sought property.

Implementations can include any, all or none of the following features. The request can be generated by a user in a process of creating an implementation that includes the data element, the implementation configured for use in the context. The at least one logical rule can (i) define a rule head as an association between the data element and the at least one sought property, and (ii) define the rule head to be true on condition that a rule body is true, and evaluating the rule can include determining whether the rule body matches the context. The at least one logical rule can be included in a plurality of rules stored in a repository, and evaluation of any of the rules can include using an ontology stored in the repository. Evaluating the logical rule can include accessing at least part of an n-ary N:M relation between N number of data elements and M number of properties, and the context value can be defined based on at least one of n number of context categories. The plurality of rules can intensionally represent a context dependency of a plurality of properties. Creation of the ontology can formalize a metamodel for the at least one data element. Modeling primitives of the metamodel can be used in creating the ontology. The evaluation of the logical rule can be performed by a reasoner that performs a data management operation. The reasoner can execute at least one query and make at least one inference in performing a logical testing to determine that the at least one sought property of the data element is valid in the context.

In a second aspect, a computer program product is tangibly embodied in an information carrier and includes instructions that when executed by a processor perform a method for identifying a property of a data element. The method includes receiving a request for at least one sought property of a data element. The data element is configured for use in semantically identifying information portions in electronic communications. The sought property is to be valid in a context defined by at least one context value indicated by the request. The method includes identifying the at least one sought property by evaluating at least one logical rule that defines at least one property of the data element as being valid for a specified context. The method includes generating an output in response to the request that indicates the at least one sought property.

In a third aspect, a computer-implemented method for defining a property of a data element includes receiving an input to modify at least one data element of a plurality of data elements defined in a repository. The data elements are configured for use in semantically identifying information portions in electronic communications. The input requests that a property of the data element be valid in a context defined by at least one context value indicated by the input. The method includes identifying a logical rule in the repository that defines at least one property of the data element as being valid for a specified context. The method includes storing a modified version of the identified rule in the repository. The modified version defines that the property of the data element is valid in the context defined by the at least one context value.

Implementations can include any, all or none of the following features. A user can generate the input in relation with an implementation that includes the data element, the implementation configured for use in the context. The at least one logical rule can (i) define a rule head as an association between the data element and the at least one sought property, and (ii) define the rule head to be true on condition that a rule body is true, and evaluating the rule can include determining whether the rule body matches the context. The at least one logical rule can be included in a plurality of rules stored in a repository, the repository further including an ontology for use in evaluating any of the plurality of rules. The repository can include an n-ary N:M relation between N number of data elements and M number of properties, and the context value can be defined based on at least one of n number of context categories. The plurality of rules can intensionally represent a context dependency of a plurality of properties. Creation of the ontology can formalize a metamodel for the at least one data element. Modeling primitives of the metamodel can be used in creating the ontology. The received input can be at least one selected from: (i) input requesting that the indicated context value be added to a logical rule; (ii) input requesting that the property be added to the repository; and (iii) combinations thereof.

In a fourth aspect, a computer program product is tangibly embodied in an information carrier and includes instructions that when executed by a processor perform a method for defining a property of a data element. The method includes receiving an input to modify at least one data element of a plurality of data elements defined in a repository. The data elements are configured for use in semantically identifying information portions in electronic communications. The input requests that a property of the data element be valid in a context defined by at least one context value indicated by the input. The method includes identifying a logical rule in the repository that defines at least one property of the data element as being valid for a specified context. The method includes storing a modified version of the identified rule in the repository. The modified version defines that the property of the data element is valid in the context defined by the at least one context value.

Implementations can provide any, all or none of the following advantages. An improved representation and management of data elements can be provided. A standardized data element can advantageously be provided with an ontological representation. Logical rules can be applied for representing context dependency. A rule-based reasoning can be applied for managing context dependency. Context dependency can be represented and managed to be more intuitive, better maintainable, and more expressive.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
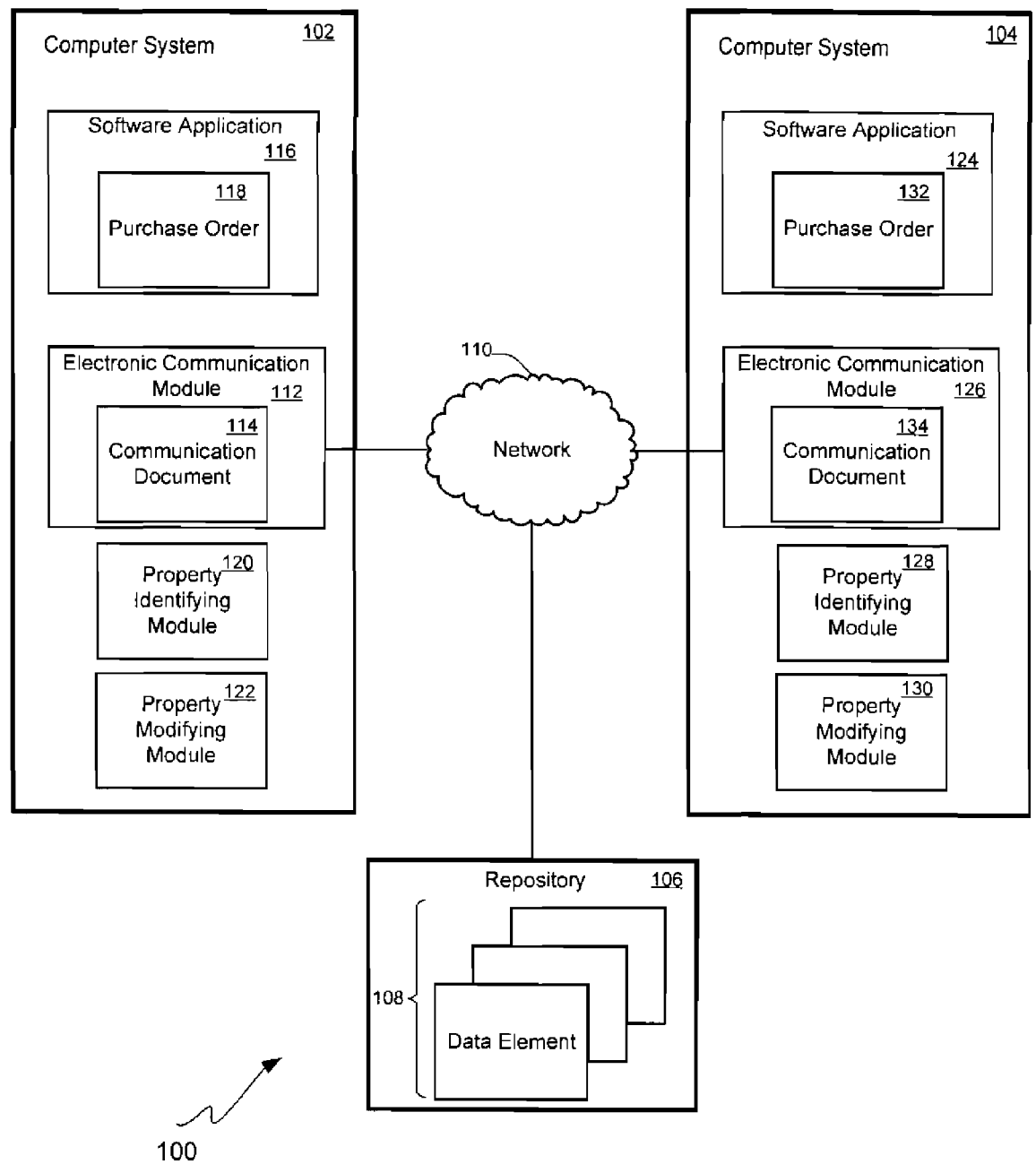
FIG. 1 is a block diagram of a system that uses data elements for electronic communication.

FIG. 1 shows an exemplary system 100 for identifying and/or modifying data elements. For example, a data element can be included as a component of an electronic communication, such as in a formatted electronic document, to identify a specific information category or information portion therein. In some examples, each of the data elements may be associated with one or more contexts that qualify and refine the data elements according to their use. For example, the data elements are categorized in context categories. In some implementations, all data elements, types and code values are categorized in context categories. Examples of context categories include, but are not limited to, industry, country, business role, official constrains and system capabilities.

Based on context values in each of the context categories, a data element can be shared among one or more communities. For example, communities in the same country may share a common currency code. Using the system 100, for example, business partners can identify business data components for creating electronic communication documents (e.g., purchase orders, invoices, contact information, product catalogs, etc.). The description below will give examples of modeling business message contexts for a specific implementation context, and also of locating a relevant data element for such a context.

The system 100 includes computer systems 102, 104 and a repository 106. For example, each of the computer systems 102, 104 may be operated by one of the parties of an electronic communication. As shown, the repository 106 stores a plurality of data elements 108. In some embodiments, the repository 106 can also store properties, such as context values, associated with the data elements 106. In some examples, the context values may classify the data elements with respect to one or more context categories. Using the properties associated with the data elements, a user can query and download appropriate data elements that are relevant to the user's context The repository 106 and the computer systems 102, 104 are connected via a network 110 (e.g., the Internet). In one example, the computer systems 102, 104 can access the repository 106 to obtain definitions and properties of the data elements 108 through the network 110. In one example, the repository 106 can evaluate rules to identify properties of the data elements according to the evaluation result.

The computer system 102 includes an electronic communication module 112 to interface with the network 110. In this example, the electronic communication module 112 includes a communication document 114. In one example, the electronic communication module 112 may transmit the communication document 114 to the computer system 104 through the network 110. In another example, the electronic communication module 112 may receive the communication document 114 from the computer system via the network 110.

The computer system 102 also includes a software application 116 for processing electronic documents for electronic communications. For example, the software application 116 may be a software editor that presents electronic documents. In the depicted example, the software application 116 includes a purchase order 118 for processing. In one example, the software application 116 may include data elements to create the purchase order 118 to be transmitted to the computer system 102. In another example, the software application 116 may identify data elements in the communication document 114 and present the purchase order 118 according to the data elements.

In one embodiment, the computer system 102 can semantically identify properties of the data elements for electronic communications. For example, this can be done using a property identifying module 120. The property identifying module 120 can identify the properties of the data elements in a specified context. In one embodiment, the property identifying module 120 may transmit a request to the repository 106, via the network 110, to seek a property of a data element. For example, a user who is about to model a business message for a specific context may wish to learn what aspects should be associated with a "purchase order" in that context and can generate the request for this reason. After receiving the request, the repository 106 may identify the sought property or properties and return an output to the computer system 102 indicating the sought property. In one embodiment, the repository 106 may evaluate the received request according to a set of rules to identify one or more sought properties.

The computer system 102 can include a property modifying module 122 for defining a property of a data element. In one embodiment, the property modifying module 122 can transmit a request to the repository 106. For example, the property modifying module 122 can transmit a request to modify a property of the data element to be valid in a user-specified context. For example, a user who needs to use a certain aspect of a purchase order in a specific context can generate the request to extend the definition with this context. In some implementations, the input request may indicate one or more context values to be added to a rule for identifying the properties, one or more properties to be added to the repository 106, or both.

Similarly, the computer system 104 includes a software application 124, an electronic communication module 126, a property identifying module 128, and a property modifying module 130. A user of the computer system 104 can use the software application 124 to edit or review, in this example, a purchase order 132. The user can also use the computer system 104 to transmit or receive a communication document 134 via the network 110. The components bearing the same name as components in the system 10 may have identical or similar functions to those component. Using the property identifying module 128 and the property modifying module 130, the user can identify sought properties and defining one or more properties in the repository 106.

In operation, the users of the computer systems 102, 104 can create one or more electronic documents, such as the purchase orders 118, 132, that includes data elements configured for use in the users' context. For example, the users can retrieve data elements that are applicable in the users' context by using the property identifying modules 120, 128.

As an illustrative example, a North American car manufacturer may create the purchase order 118. To configure the purchase order 118, the North American car manufacturer can specialize the purchase order 18 by transmitting a request to the repository 106, seeking properties suitable for use in the manufacturer's context. For example, the manufacturer can seek suitable data elements (e.g., attributes in the purchase order 118) to be included in the purchase order 118. In one implementation, the North American car manufacturer may transmit a request to the repository 106 by providing context values, such as geographical context (e.g., North America) or industry context (e.g., car manufacturing industry). According to the provided context values, the repository 106 may provide a specialization of the data elements used in the purchase order 118. For example, the repository 106 may provide an output to indicate that the purchase order 118 may include a certain amount of tax in addition to the sale price and the monetary value may be represented in US dollars.

Users of the system 100 can also modify and/or define new properties and data elements in the repository 106. Using the example above, the North American car manufacturer can modify the specialized purchase order 118 to create an extension of the purchase order 118. For example, the North American car manufacturer can use the software application 116 to edit the specialized version of the purchase order 118.

In some implementations, the North American car manufacturer can upload the extension of the purchase order 118 back into the repository 106. For example, the extension of the purchase order 118 may be represented by one or more data elements to be stored in the repository 106. The one or more data elements may be associated with properties that are applicable to some additional context values of the North American car manufacturer. By doing so, the specialization made by the North American car manufacturer may be publicly available for business partners in the automotive industry and/or other users.

In one example, if a cosmetics supplier in France has the same or similar requirements as the North American car manufacturer, the cosmetics supplier can use the data elements uploaded by the car manufacturer. Furthermore, the cosmetics supplier in France can add context values into the appropriate context categories in the repository 106 for the uploaded data elements. For example, the cosmetics supplier may update the rules associated with the uploaded data elements in the repository 106, add new context values associated with the uploaded data elements, or both. This can let other users know that the uploaded data elements will be appropriate in more than one context. By providing a collaborative modification of properties of the data elements 108, the system 100 can make it possible to adjust the properties according to real business requirements in an evolutionary way.

Figure 2:
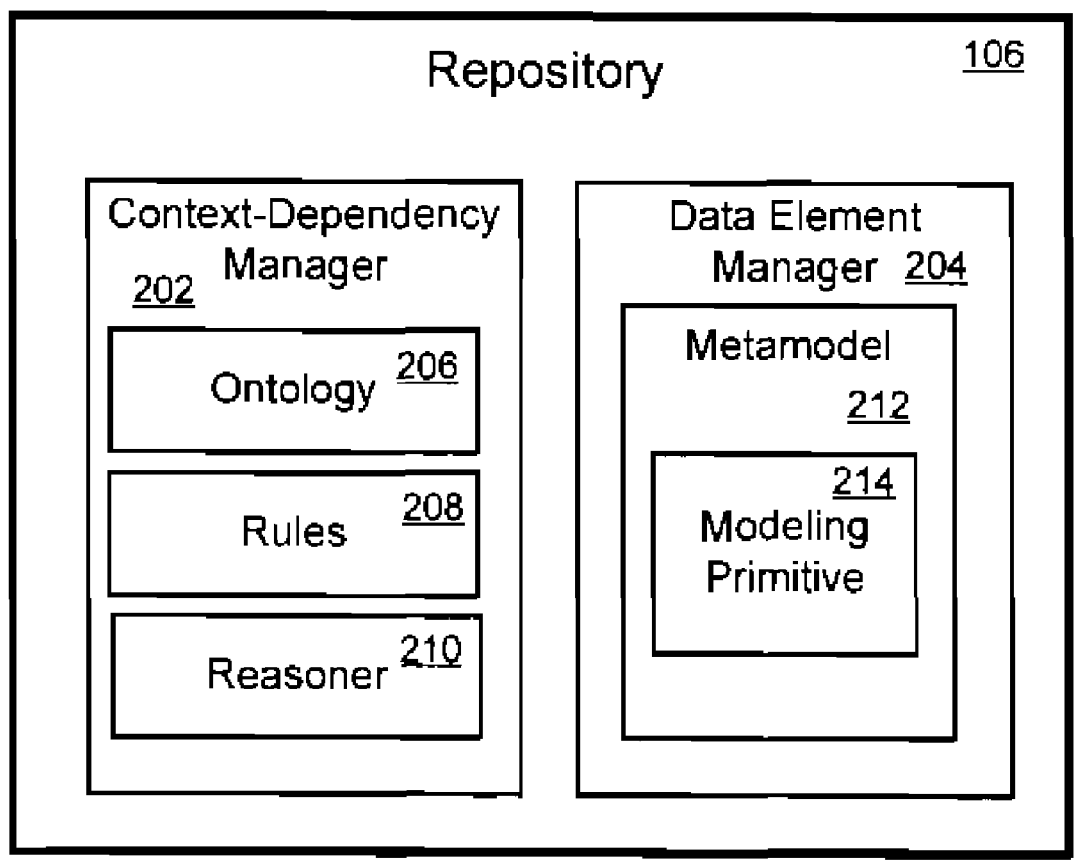
FIG. 2 is a block diagram of a system that stores data elements and rules related to the data elements.

FIG. 2 shows an example of the repository 106 that can be used in the system 100. The repository 106 here includes a context-dependency manager 202 and a data element manager 204. For example, the context dependency manager 202 may be configured to evaluate rules with respect to a specified context. For example, the data element manager 204 may be configured to manage associations between the data elements 108 and properties associated with the data elements 108. In one example, the repository 106 can be used to identify and modify properties of data elements using the context-dependency manager 202 and the data element manager 204.

The context-dependency manager 202 here includes an ontology 206, rules 208, and a reasoner 210. In one implementation, the ontology 206 may be a data model that represents a set of properties within a domain (e.g., relationships between the properties and the data elements 108). By adding one or more formulae to the ontology 206, the context dependency of the properties may be expressed in terms of the rules 208. In some implementations, the ontology 206 represents the CCTS metamodel.

A reasoner 210 can use the ontology 206 to evaluate the rules 208. In some implementations, the reasoner 210 may be a data management module with querying and inference capabilities. For example, the reasoner 210 may be implemented using the Ontobroker inference engine from Ontoprise GmbH in Karlsruhe, Germany and the ontology 206 may be created using the ontology language called F-Logic. Other reasoners and/or ontology languages can be used.

In some implementations, the creation of the ontology 206 may formalize a metamodel 212 in the data element manager 204. For example, the metamodel 212 may be specified via the ontology 206. In some examples, the repository 106 stores and manages the date elements 108 according to the metamodel 212. The metamodel 212 includes one or more modeling primitives 214. The modeling primitive 214 may include modeling primitives featured in the ontology 206 and/or modeling primitives used in the Core Components Technical Specification (CCTS) metamodel, to name a few examples. For example, the model primitives 214 may include classes, relations, attributes, cardinalities, and inheritance. In various implementations, specific data elements and properties may be configured as instances of respective classes in the metamodel 212.

Using the ontology 206, the reasoner 210 can evaluate any of the rules 208. For example, the reasoner 210 can perform logical testing to validate the sought property under a specified context. Examples of this will be give below.

Figure 3:
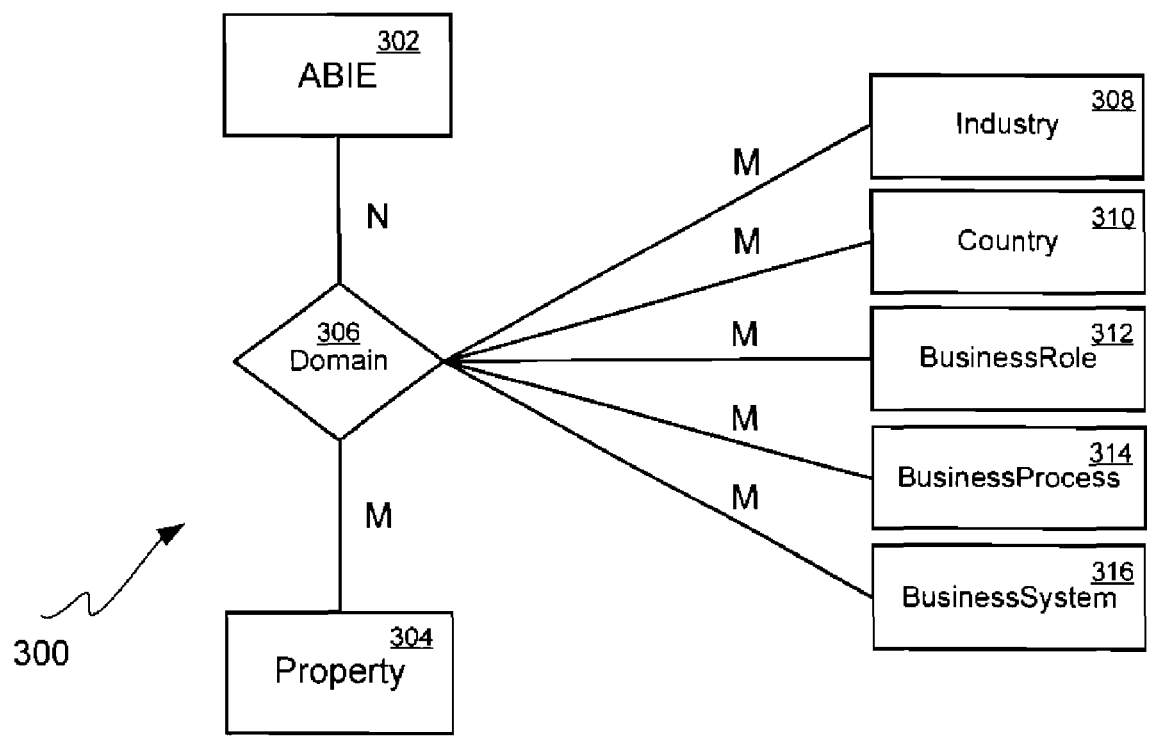
FIG. 3 is a schematic diagram of a context that requires a n-ary N:M relation between ABIE and its properties.

FIG. 3 is a schematic diagram of an example of a portion 300 of a metamodel/ontology. Here, the portion 300 includes an n-ary N:M relation 306 between aggregate business information entity (ABIE) 302 and its one or more properties 304. For example, a purchase order ABIE may be related to one or more specific properties, such as party, in a context of the North American car manufacturer. Thus, the ABIE 302 in this example is implemented according to the UN/CEFACT core components specification. In other implementations, another type of data element can be used, for example one that does not relate to the core components specification.

As shown, the relation 306, such as a set of the rules 208, can define an n-ary relation between N number of ABIEs 302 and M number of properties 304. For example, the ABIE can correspond to a purchase order and the property to a Party component for the purchase order. Accordingly, the domain 306 can define, for any or all of several contexts, whether the purchase order should include the property Party. In an implementation, the domain relation can be represented by one or more rules.

In this example, the relations are defined based on context values in one or more of the context categories. Here, each of the relations includes one or more of multiple context categories, such as an Industry category 308, a Country category 310, a BusinessRole category 312 (e.g., a buyer, a seller, a consultant, etc.), a BusinessProcess category 314 (e.g., sales manager, engineer, etc.), and a BusinessSystem category 316. For example, one or more of the ABIEs 302 may be specialized to be related to a specific industry, country, business role, business process, or business system. In one example, a user can provide a specific context (e.g., Industry=car manufacturing, Country=USA, Canada) in the categories 308, 310, 312, 314, 316 to the domain and receive one or more specialized ABIEs 302 based on the specific context.

In one implementation, the context dependency of the relation 300 can be represented by the domain 306 to realize the metamodel 212. For example, the domain 306 can be implemented by the rules 208 specified using the ontology 206. In some implementations, the reasoner 210 can evaluate the domain 300 based on a specified context and a logical theory (e.g., the ontology 206).

In some implementations, a user can input a query to the repository 106 to seek the relevant properties of a specific ABIE or other data element. In some implementations, the reasoner 210 can find one or more properties X that satisfy the input query. For example, the reasoner 210 can conduct a logical proof If the domain 306 includes the example rule described above, a result of the logical proof can be X=Party.

In a specific example, the CCTS metamodel can be represented by an ontology. Assume it has been determined that the portion 300 (and in particular, the relation 306) is the most interesting part of the metamodel and the ontology for a current situation or scenario. Thus, the CCTS metamodel can be represented by the ontology, as opposed to, say, by UML. This can provide an advantage because ontology languages are logics-based which is a prerequisite for reasoning. For example, this means that rule-based reasoning can be applied for representing and managing context-dependency in a standardized data element structure, such as in CCTS. In such an implementation, the relation 306 can represent the core of the context dependency.

With reference now also to FIG. 2, in some implementations at least one of the rules 208 includes a rule head and a rule body. In one example, the rule head may include an association between a data element and one or more properties. The rule body can include at least one context value, for example relating to one or more context categories.

A rule can have the syntactic form of:

$$\text{FORALL } X, Y, \ldots \text{ rule head} \leftarrow \text{rule body},$$

wherein the rule body includes the context values $X, Y, \ldots$ and the rule head includes the relation being specified by the rule. This means that if the context values $X, Y, \ldots$ are present (the rule body), the domain relation holds (the rule head is true). For example, this means that the domain relation described with reference to FIG. 3 holds. A specific example of a rule may be $$\begin{aligned}&\text{FORALL } X, Y, Z, \ldots \\ &\quad \text{domain (PurchaseOrder, Party, } X, Y, Z, \ldots) \\ &\quad \leftarrow \\ &\quad \text{Industry } (X) \text{ AND} \\ &\quad \text{Country } (Y) \text{ AND} \\ &\quad \text{BusinessRole } (Z) \text{ AND} \\ &\quad \ldots \text{ AND} \\ &\quad (X=\text{Automotive}) \text{ AND} \\ &\quad (Y=\text{USA OR } T=\text{Canada})\end{aligned}$$

The placeholder X is seen to correspond to the Automotive industry, and the placeholder Y is seen to correspond to USA or Canada, per the rule. Accordingly, the interpretation of the above rule can be that if the industry is Automotive and the country is USA or Canada, and if the business role is Z, then it is true that a purchase order should have a Party component. In this example, Z is a variable without further restriction so that any and all business roles are covered by the expression. It is noted that this example included only a few context values for simplicity. In other examples the rule can be valid for many context values. Many separate rules can be used, for example to cover different combinations of values of the several context categories.

As another example, the reasoner 210 can handle a query that reads $$\text{FORALL } X \leftarrow \text{domain (PurchaseOrder, } X, \text{Automotive, USA, } \ldots).$$

This query seeks the property X that a purchase order should have in the specified context. Accordingly, the reasoner 210 can find all properties X that satisfy the query. In so doing it can draw the inference that the identified X (or each of the multiple identified X's, as the case may be) is a property required of the data element in this context.

In the above examples, then, it can be seen that the rules 208 can define the relationship(s) between a data element and one or more relevant contexts by naming the one or more property (e.g., the Party property) that is part of the component in that context. That is, in such an implementation the data element can be viewed as being defined by the rules as to what contents (e.g., properties) it should have. As such, the body of rules (e.g., evaluated using an ontology) can be said to intensionally represent the context dependency. One advantage of such an implementation can be that the intensional representation can require significantly less resources (e.g., take up less space) than another way of representing the context dependency.

Figure 4:
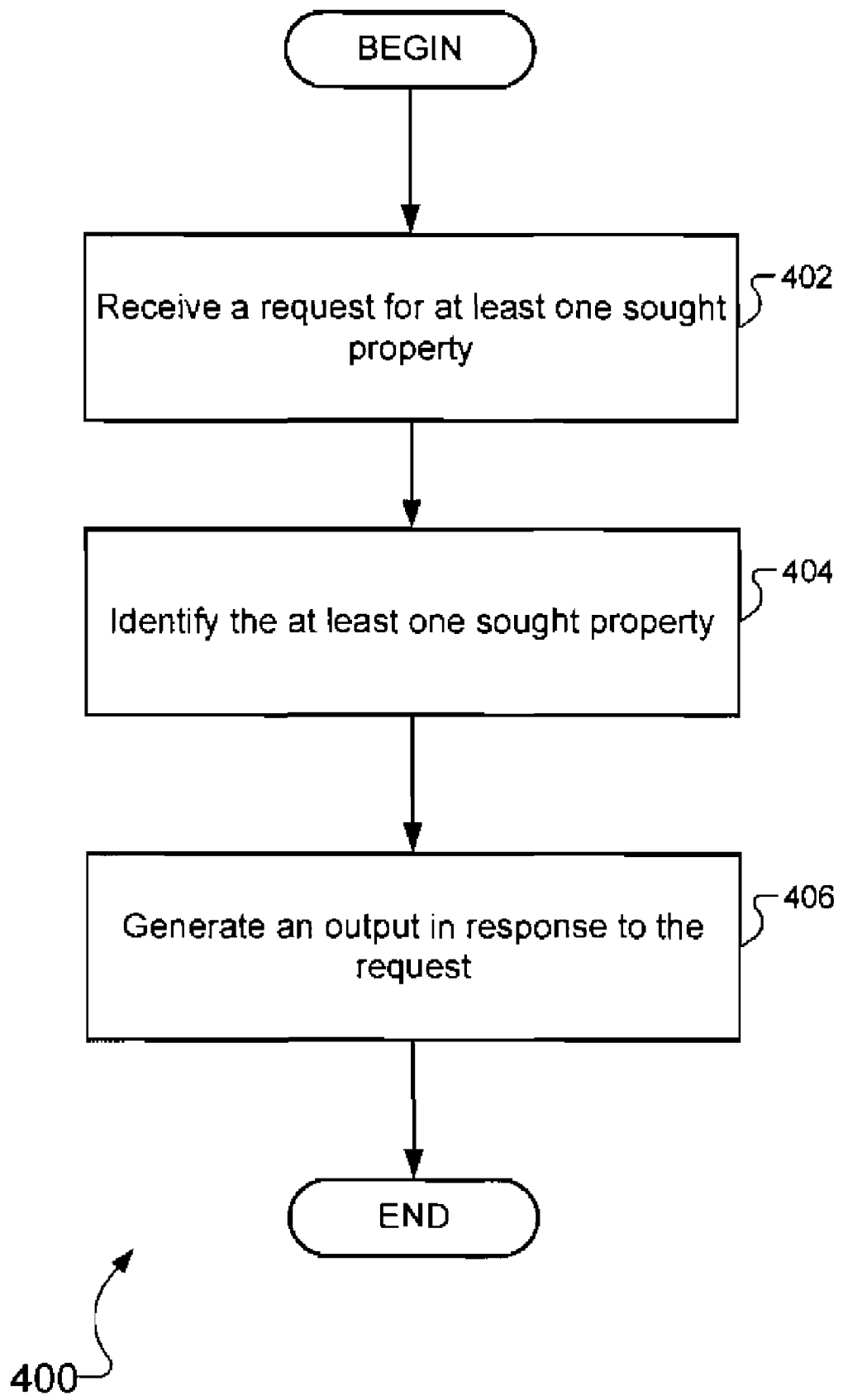
FIG. 4 is a flow diagram for identifying a property of a data element.

FIG. 4 is a flow chart of exemplary operations 400 that can be performed for creating identifying a property of a data element. The operations 400 can be performed by a processor executing instructions stored in a computer program product. For example, the repository 106 can perform some or part of the operations 400. The operations 400 begin in step 402 with receiving a request for at least one sought property of a data element. The data element is configured for use in semantically identifying information portions in electronic communications. In some implementations, the repository 106 can receive a request from the computer system 102 to identify a sought property of a data element (e.g., a field attribute of a purchase order). The sought property can be valid in a context defined by one or more context values indicated by the request. For example, the request can include context value indicating a context of the computer system 102 and the sought property is valid with respect to the indicated context.

Next, the operations 400 comprise, in step 404, identifying the at least one sought property. For example, the repository 106 can use the reasoner 210 to evaluate the rules 208 using the provided context in order to identify the sought property. In some examples, at least one of the rules 208 may define a valid property of the data element based on the provided context.

In step 406, the operations 400 comprise generating an output in response to the request. For example, the repository 106 generates an output message to be transmitted to the computer system 102 after identifying the sought property. In one implementation, the output may indicate the valid property.

Figure 5:
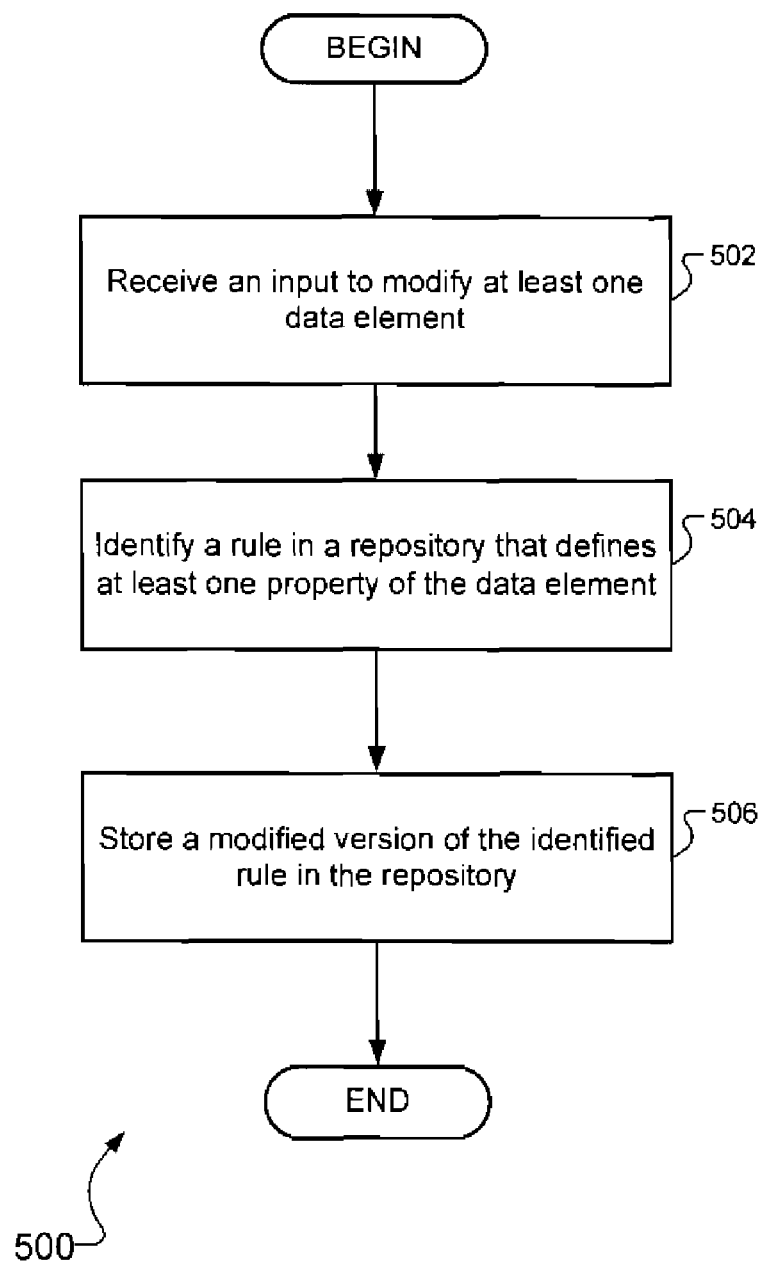
FIG. 5 is a flow diagram for defining a property of a data element.

FIG. 5 is a flow chart of exemplary operations 500 that can be performed for defining a property of a data element. The operations 500 can be performed by a processor executing instructions stored in a computer program product. For example, the repository 106 can perform some or part of the operations 500. The operations 500 begin in step 502 with receiving an input to modify at least one data element of a plurality of data elements defined in a repository. For example, the repository 106 can receive a request to modify at least one of the data elements 108 and its associated properties. In some implementations, the input request is made to set a property of the data element so that the property is valid in a context defined by at least one context value indicated by the input. For example, the repository 106 can receive an input request to modify the rules 208 so that one or more of the properties can be valid in a context specified in the input.

Next, the operations 500 comprise, in step 504, identifying a rule in the repository that defines at least one property of the data element as being valid for a specified context. For example, the repository 106 can identify one or more of the rules 208 that relate the specified context and the property.

In step 506, the operations comprise storing a modified version of the identified rule in the repository. In some implementations, the modified version defines the property to be valid in the context specified in the input. For example, the repository 106 can modify the rules 208 and express the modified rules using the ontology 206 such that the property is valid in the specified context.

Figure 6:
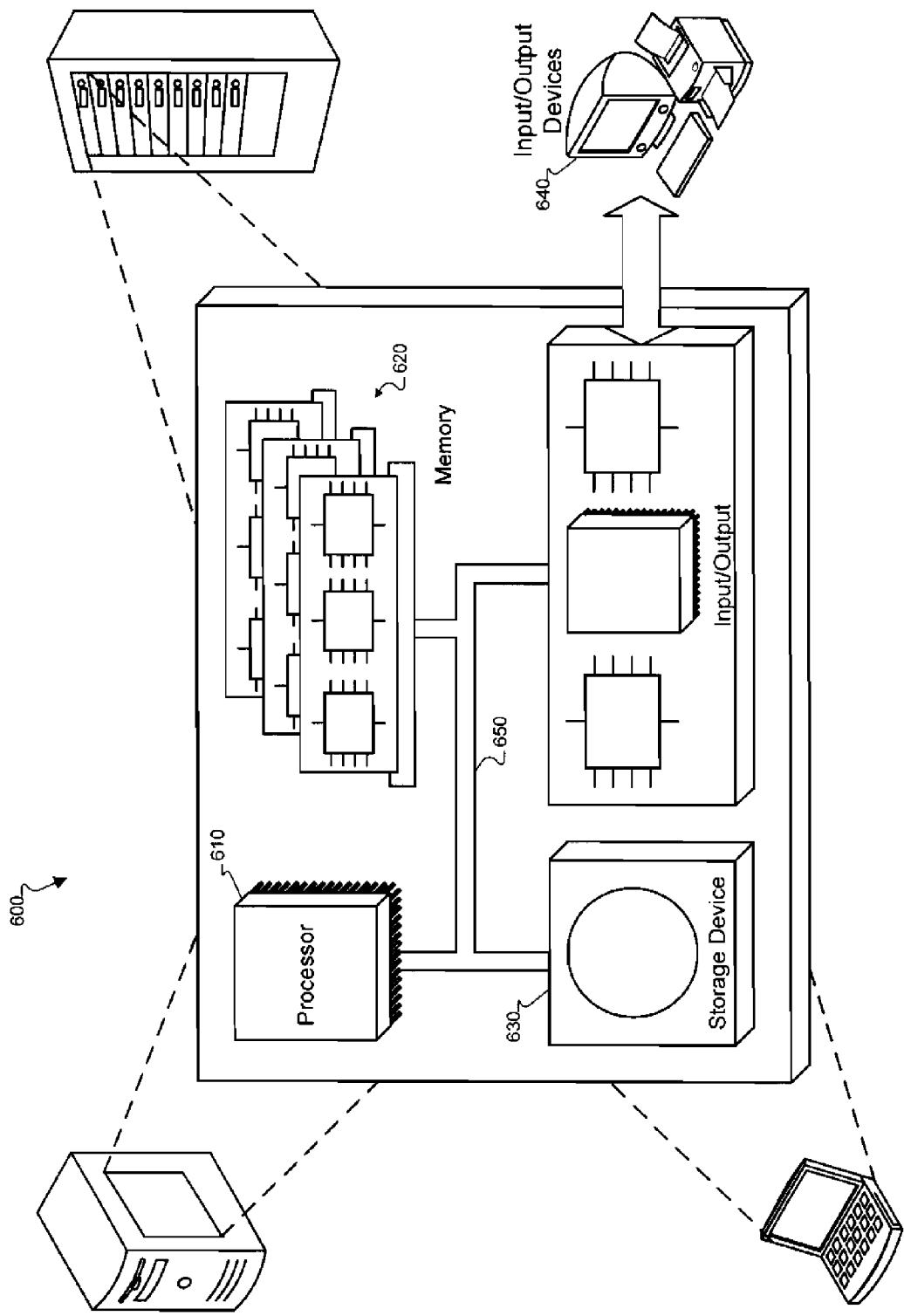
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor.

The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method, the method comprising:
    receiving, by a computer system, a request for multiple data elements that are specialized for use in generating an electronic document for a particular context, the request indicating at least one context value that specifies the particular context, each of the multiple data elements configured for use in semantically identifying information portions in the electronic document or other electronic documents of the particular context, the multiple data elements to be valid in the particular context;
    identifying, by the computer system, the multiple data elements as being specialized for the particular context from a repository of data elements, wherein the identification of the multiple data elements includes evaluating at least one logical rule that defines a data element of the multiple data elements as being valid for the at least one context value; and
    generating, by the computer system, an output of the multiple data elements so as to allow a user to generate the electronic document for the particular context using at least some of the multiple data elements, the output being in response to the request for the multiple data elements.

2. The computer-implemented method of claim 1, wherein the request is generated by the user in a process of creating the electronic document that includes the at least some of the multiple data elements, the electronic document configured for use in the particular context.

3. The computer-implemented method of claim 1, wherein the at least one logical rule (i) defines a rule head as an association between the data element and at least one sought property, and (ii) defines the rule head to be true on condition that a rule body is true, and wherein evaluating the rule comprises determining whether the rule body matches the particular context.

4. The computer-implemented method of claim 1, wherein the at least one logical rule is included in a plurality of rules stored in the repository, and wherein evaluation of any of the rules uses an ontology stored in the repository.

5. The computer-implemented method of claim 4, wherein evaluating the logical rule comprises accessing at least part of an n-ary N:M relation between N number of data elements and M number of properties, and wherein the particular context is defined based on at least one of n number of context categories.

6. The computer-implemented method of claim 4, wherein the plurality of rules intensionally represents a context dependency of a plurality of properties.

7. The computer-implemented method of claim 4, wherein creation of the ontology formalizes a metamodel for the data elements in the repository.

8. The computer-implemented method of claim 7, wherein modeling primitives of the metamodel are used in creating the ontology.

9. The computer-implemented method of claim 1, wherein the evaluation of the logical rule is performed by a reasoner that performs a data management operation.

10. The computer-implemented method of claim 9, wherein the reasoner executes at least one query and makes at least one inference in performing a logical testing to determine that the data element is valid in the particular context.

11. A computer program product tangibly embodied in a machine-readable storage device and comprising instructions that when executed by a processor perform a method, the method comprising:
    receiving, by a computer system, a request for multiple data elements that are specialized for use in generating an electronic document for a particular context, the request indicating at least one context value that specifies the particular context, each of the multiple data elements configured for use in semantically identifying information portions in the electronic document or other electronic documents of the particular context, the multiple data elements to be valid in the particular context;
    identifying, by the computer system, the multiple data elements as being specialized for the particular context from a repository of data elements, wherein the identification of the multiple data elements includes evaluating at least one logical rule that defines a data element of the multiple data elements as being valid for the at least one context value; and
    generating, by the computer system, an output of the multiple data elements so as to allow a user to generate the electronic document for the particular context using at least some of the multiple data elements, the output being in response to the request for the multiple data elements.

12. A computer-implemented method comprising:
    storing, by a computer system, an electronic document that a user obtained from a repository, the electronic document including multiple data elements, the multiple data elements being configured for use in semantically identifying information portions in the electronic document, the multiple data elements being valid in a particular context that is defined by at least one context value and that is associated with the electronic document;

receiving, by the computer system, user modification of the electronic document that adds a new data element to the electronic document or modifies an existing data element in the electronic document to specify a new property;

receiving, by the computer system, user input uploading the electronic document back into the repository;

identifying, by the computer system, a logical rule in the repository that defines the new data element or at least one property of the existing data element as being valid for a specified context; and storing, by the computer system, a modified version of the identified rule in the repository, the modified version defining that the new data element or the property of the existing data element is valid in the particular context that is defined by the at least one context value.

13. The computer-implemented method of claim 12, wherein the at least one logical rule (i) defines a rule head as an association between the new data element and at least one property or an association between the existing data element and at least one property, and (ii) defines the rule head to be true on condition that a rule body is true, and wherein evaluating the rule comprises determining whether the rule body matches the particular context.

14. The computer-implemented method of claim 12, wherein the at least one logical rule is included in a plurality of rules stored in the repository, the repository further including an ontology for use in evaluating any of the plurality of rules.

15. The computer-implemented method of claim 14, wherein the repository includes an n-ary N:M relation between N number of data elements and M number of properties, and wherein the particular context is defined based on at least one of n number of context categories.

16. The computer-implemented method of claim 14, wherein the plurality of rules intensionally represents a context dependency of a plurality of properties.

17. The computer-implemented method of claim 14, wherein creation of the ontology formalizes a metamodel for the new data element or the existing data element.

18. The computer-implemented method of claim 17, wherein modeling primitives of the metamodel are used in creating the ontology.

19. A computer program product tangibly embodied in an a machine-readable storage device and comprising instructions that when executed by a processor perform a method, the method comprising:

storing, by a computer system, an electronic document that a user obtained from a repository, the electronic document including multiple data elements, the multiple data elements being configured for use in semantically identifying information portions in the electronic document, the multiple data elements being valid in a particular context that is defined by at least one context value and that is associated with the electronic document;

receiving, by the computer system, user modification of the electronic document that adds a new data element to the electronic document or modifies an existing data element in the electronic document to specify a new property;

receiving, by the computer system, user input uploading the electronic document back into the repository;

identifying, by the computer system, a logical rule in the repository that defines the new data element or at least one property of the existing data element as being valid for a specified context; and storing, by the computer system, a modified version of the identified rule in the repository, the modified version defining that the new data element or the property of the existing data element is valid in the particular context that is defined by the at least one context value.

* * * * *